(12) United States Patent
Tsien

(10) Patent No.: US 7,953,936 B2
(45) Date of Patent: *May 31, 2011

(54) HIDING CONFLICT, COHERENCE COMPLETION AND TRANSACTION ID ELEMENTS OF A COHERENCE PROTOCOL

(75) Inventor: Benjamin Tsien, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 12/251,329

(22) Filed: Oct. 14, 2008

(65) Prior Publication Data

US 2009/0037665 A1    Feb. 5, 2009

Related U.S. Application Data

(63) Continuation of application No. 11/221,615, filed on Sep. 7, 2005, now Pat. No. 7,437,518.

(51) Int. Cl.
*G06F 13/14* (2006.01)

(52) U.S. Cl. ........................................................ 711/141
(58) Field of Classification Search ................... None
See application file for complete search history.

(56) References Cited

U.S. PATENT DOCUMENTS

| 5,974,456 | A | 10/1999 | Naghshineh et al. |
| 6,615,319 | B2 * | 9/2003 | Khare et al. .................. 711/141 |
| 7,398,361 | B2 * | 7/2008 | Gunna et al. .................. 711/146 |
| 2004/0123046 | A1 | 6/2004 | Hum et al. |
| 2006/0259707 | A1 * | 11/2006 | Freytag ......................... 711/146 |

* cited by examiner

*Primary Examiner* — Duc T Doan
(74) *Attorney, Agent, or Firm* — Blakely, Sokoloff, Taylor & Zafman LLP

(57) ABSTRACT

According to one embodiment of the invention, an apparatus having one or more cache agents and a protocol agent is disclosed. The protocol agent is coupled to the one or more cache agents to receive events corresponding to cache operations from the one or more cache agents to maintain ordering with respect to the cache operation events. The protocol agent includes a structure to handle conflict resolution.

19 Claims, 10 Drawing Sheets

HIDING CONFLICT, COHERENCE COMPLETION AND TRANSACTION ID ELEMENTS OF A COHERENCE PROTOCOL

RELATED APPLICATIONS

This application is a continuation application of U.S. patent application Ser. No. 11/221,615, filed Sep. 7, 2005, now U.S. Pat. No. 7,437,518.

FIELD OF INVENTION

Generally, embodiments of the invention relate to integrated electronics and integrated electronics systems. More specifically, embodiments of the invention relate to a technique and corresponding infrastructure to maintain order of events corresponding to operations for caching agents operating according to a caching protocol where the caching agents are separated from the protocol agents.

BACKGROUND

Computer systems and processor architectures, in particular, can use various types communication networks and protocols to exchange information between agents, such as electronic devices, within those systems and architectures. Multiple processing elements ("processing cores") in a microprocessor, for example, use caching agents to store, retrieve, and exchange data between the various cores of the microprocessor. Likewise, computer systems in which single or multiple core microprocessors are interconnected may use caching agents to store, retrieve and exchange data between the microprocessors or other agents.

In electronic networks, cached data is managed and exchanged according to certain rules, or "protocol," such that coherency is maintained among the various caches and the devices, such as processing cores, that use the cached data. Caching activity across these devices directly serviced by the caches, such as lookup operations, store operations, invalidation operations, and data transfer operations, can be managed by logic or software routine (collectively or individually referred to as a "cache agent"), such that cache coherency is maintained among the various caches and cache agents. Caching activity within or outside of a microprocessor, such as snoop resolution, write-backs, fills, requests, and conflict resolution, can be managed by logic or software routine (collectively or individually referred to as a "protocol agent"), such that coherency is maintained among the various cache agents and processing cores within the microprocessor and among agents external to the microprocessor. In some prior art multi-core or single-core processors, for example, the caching agent is coupled to a specific coherence protocol agent, which may be physically integrated within the caching agent to which it corresponds. This means that the same circuit and/or software routine may be responsible for implementing cache operations, such as requests, dirty block replacement, fills, reads, etc., as the protocol for managing these operations.

FIG. 1 illustrates a prior art microprocessor having a number of caching agents, each having circuitry to implement the caching protocol used among the caching agents of the microprocessor. In the prior art processor of FIG. 1, each caching agent is responsible for implementing and keeping track of the cache protocol as applied to itself. That is, each cache agent is coupled to a protocol agent, such that the same unit is responsible for both cache operations and the coherence protocol. Unfortunately, this "decentralized" caching protocol architecture requires redundant use of protocol logic and/or software to maintain the caching protocol among all caching agents within the processor or computer system to which the protocol corresponds. In the case of the protocol being implemented using complementary metal-oxide-semiconductor (CMOS) logic devices, this can result in substantial power consumption by the processor or system, especially in multi-core processors having a number of caching agents.

Furthermore, the prior art caching architecture of FIG. 1 may be somewhat bandwidth limited in the amount of caching traffic supported among the caching agents, as each caching agent has to share the same bus, cache agent ports, and cache agent queuing structure that facilitate communication among the various caching agents.

BRIEF DESCRIPTION OF THE DRAWINGS

Claimed subject matter is particularly and distinctly pointed out in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION

Embodiments of the invention disclosed herein describe a caching architecture that may be used in an electronic device, such as a single core or multiple core microprocessor, or an electronics system, such a shared bus computer system or a point-to-point (P2P) bus computer system. More particularly, one embodiment of the invention includes a caching architecture, in which the caching protocol is more centralized and decoupled from the caching agents to which the protocol corresponds than in some prior art caching architectures.

With cache agents and protocol agents being detached, the protocol agent is kept current with the coherence information manifested in the form of a set of cache operation events from the cache agents. The protocol agents receive this coherence information from cache agents through an on-chip, or local, interconnection network. In this manner, certain types of cache events may have their order maintained, so the protocol agents have a view of the internal cache states in the cache agents it services to form system level coherence protocol decisions. This virtual communication channel of events under a set of ordering rules is known as a pre-coherence channel.

In one embodiment, the interconnection network is a network of rings optimized for cache transfer between cores and caches. In one embodiment, there are three different types of ring networks to facilitate this: an address ring, a no-address ring, and a data ring. In one embodiment, every message is one phit in length and the network with three types of rings exists to balance the message load between the rings. For instance, a read request on address is balanced by a cache response on data. In one embodiment, each of the ring networks is arbitrated separately. A ring guarantees point-to-point ordering, but ordering across different rings can be skewed, so keeping ordering across ring networks means ordered injection into the ring networks from a source.

In one embodiment, to benefit most from the out-of-orderness allowed by the pre-coherence channel on this rings-based architecture, messages are split across address and no-address networks in the following way. In one embodiment, a cache agent communicates with a protocol agent using two signals that operate in part of the local, interconnection network: one signal ("AD") to communicate addressed caching operations, such as data and/or cache ownership requests, data write-back operations, and snoop responses with data for cache-to-cache transfers, from a cache agent, and one signal ("AK") to communicate non-address responses, such as cache fill acknowledgements and non-data snoop responses, such as a cache "hit" or "miss" indication.

Figure 1:
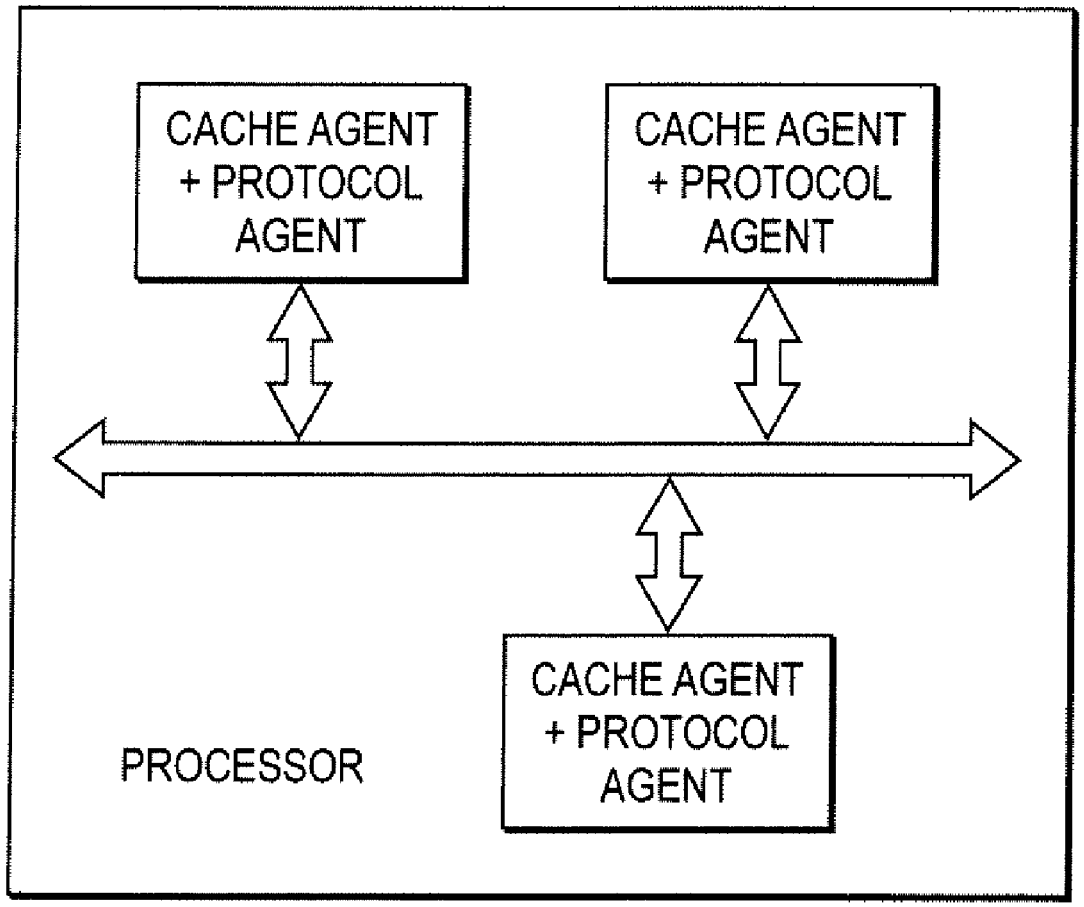
FIG. 1 illustrates a prior art caching architecture used within a microprocessor or computer system.
Figure 2:
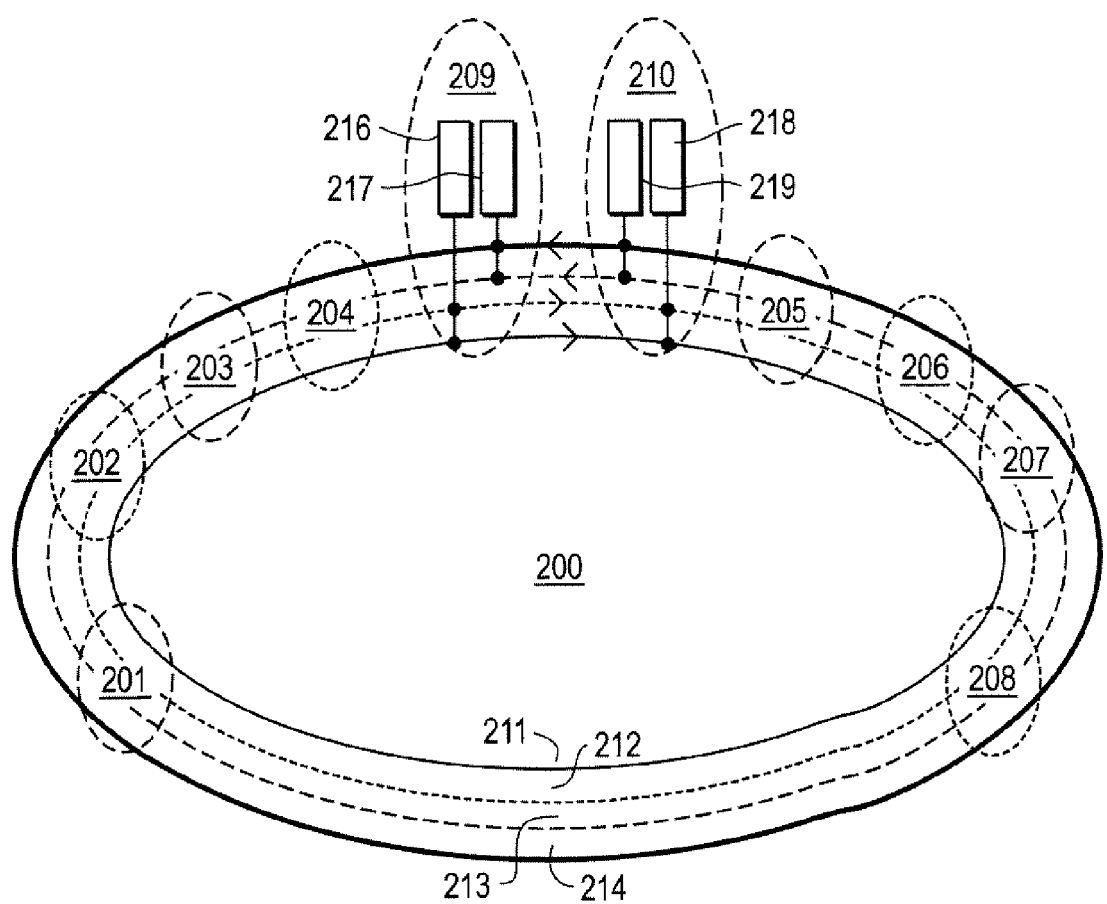
FIG. 2 illustrates a caching architecture according to one embodiment of the invention.

In one embodiment, the concurrent bidirectional characteristics of the signals, AD and AK, can be conceptualized by two sets of cache agents, routing circuits, and a protocol agent interconnected by two signals, or "rings," transmitting an AK and AD signal, respectively, in one direction. FIG. 2, for example, illustrates one embodiment of a caching architecture, in which the two signals, AD and AK, are conceptualized as four rings, two of which are capable of transmitting information in a clockwise direction and two of which are capable of transmitting information in a counter clockwise direction. In particular, the caching architecture 200 of FIG. 2 depicts a first set of caching agents 201, 203, 205, and 207 that correspond to a first caching protocol agent ("protocol agent") 209 and a second set of caching agents 202, 204, 206, and 208 that correspond to a second protocol agent 210.

Note that in alternative embodiments, only single separate rings for the AK and AD signals are used. In yet another embodiment, more than 2 rings are used for each of the AK and AD signals. In alternative embodiments, the local network connecting cache and protocol agents may be implemented as a fully connected network instead of a ring. Other alternative embodiments may encompass alternative communication networks between cache and protocol agents implemented in hardware or as a collection of one or more software routines.

Each cache agent of the first set can communicate cache operations such as loads and stores to processing cores (not shown in FIG. 2), and data requests, data write-back operations, cache fill acknowledgements, and snoop response transactions, to the first protocol agent. Likewise, each cache agent of the second set communicates these non-data cache transactions to the second protocol agent. The cache agents may communicate to the protocol agents, in one embodiment, through a series of router circuit (not shown in FIG. 2).

The first and second protocol agents are responsible for arbitrating between the various operations from their respective cache agents such that the operations are managed and completed in a manner consistent with the caching protocol of the caching architecture.

In one embodiment, each cache agent has access to four communication channels (depicted by rings in FIG. 2) 211, 212, 213, 214, upon which caching transactions may be communicated. Each cache agent may communicate cache transactions on any of the four rings illustrated in FIG. 2. In other embodiments, each cache agent may be restricted to a particular ring or group of rings upon which caching transactions may be communicated to/from the cache agent. The cache data that results from the transactions communicated on the rings of FIG. 2 may be communicated among the cache agents on other communication channels (e.g., data bus) not depicted in FIG. 2. Alternatively, in some embodiments the cache data may be communicated on the rings depicted in FIG. 2. Moreover, in other embodiments, each network in FIG. 2 may be configured in other topologies, such as tree topology or a chain.

In the embodiment illustrated in FIG. 2, caching transactions, such as data and/or cache ownership requests, data write-back operations, and snoop responses with data are sent on rings 212 and 214 ("address" rings) and transactions, such as cache fill acknowledgements and non-data snoop responses, such as a cache "hit" or "miss" indication, are transmitted on rings 211 and 213 ("non-address" rings). In other embodiments, the above or other transactional information may be transmitted on other combinations of the rings 211-214. The particular ring assignment for the various cache transactions discussed above and illustrated in FIG. 2 are only one example of the transactions and ring assignments that may be used in embodiments of the invention.

As each set of cache agents communicates information between each other via the protocol agents, an ordering of the information entering the protocol agent can be maintained, in at least one embodiment, such that the correct information will allow correct coherence protocol transitions in the protocol agent at the correct time. In one embodiment, the ordering of information within the networks is maintained by each protocol agent. More specifically, each protocol agent maintains the correct ordering of the various caching operations being performed by temporarily storing the operations as they arrive within each protocol agent and retrieving them in the order in which they arrived in order to produce correct coherence protocol transitions in the protocol agent.

In one embodiment, each protocol agent contains one or more buffers that may be used to store data, commands, or addresses originating from one of the cache agents, which can then be retrieved from the buffers in the proper order to be delivered to a particular cache agent. In the embodiment illustrated in FIG. 2, each protocol agent includes, or otherwise has associated therewith, two first-in-first-out (FIFO) buffers 216, 217, 218, 219 that are each coupled to two of the four rings of FIG. 2. Each pair of rings illustrated can communicate information in a particular direction. For example, rings 211 and 212 can communicate information in a clockwise (CW) direction, whereas rings 213 and 214 can communicate information in a counter-clockwise (CCW) direction. In an alternate embodiment, only a single FIFO is used and only two of the four rings are used.

Figure 3:
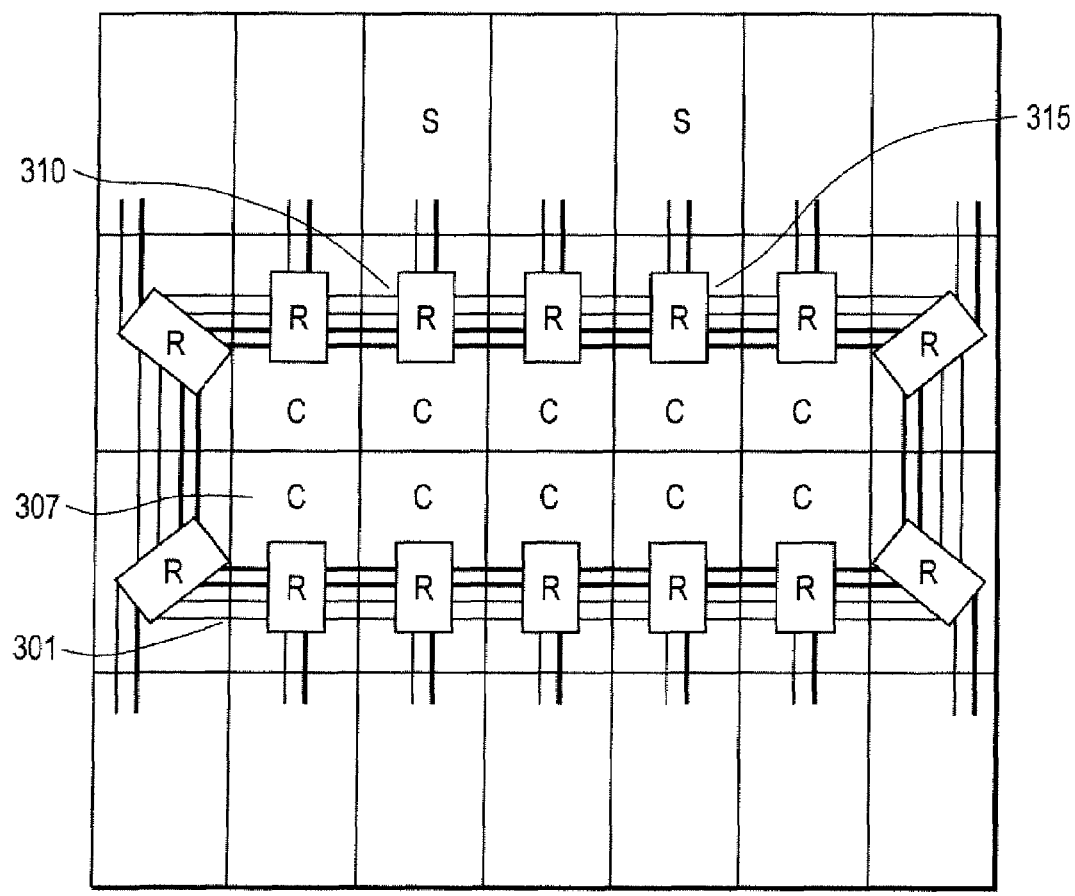
FIG. 3 illustrates a caching architecture including routing circuits according to one embodiment of the invention.

FIG. 3 is a diagram illustrating the ring structure of FIG. 2 in conjunction with various routing circuits, which route data to their intended recipient from each of the cache agents. In particular, FIG. 3 illustrates a number of cache agents, identified by the letter "C", in a ring configuration of two networks, each comprising signals AD and AK to interconnect a cache agent with a protocol agent, identified by the letter "S". A routing circuit, identified by the letter "R", is associated with each cache agent to either route information contained within signals, AD and AK, to the next cache agent within a network (if the next agent in the network is not a protocol agent) or to a protocol agent (if the next agent within the network is a protocol agent).

Two of the routing circuits 310 and 315 couple the rings of the networks in FIG. 3 to the protocol agents, whereas other routing agents connect the rings to other cache agents and other ring networks. In one embodiment, a cache agent 307 may send a signal intended for one of the protocol agents on ring 301 in a clockwise direction. The routing agents between cache agent 307 and the intended protocol agent, moving in a clockwise direction around the ring, propagates the information contained within the signal between them until the signal reaches the routing circuit, 310 or 315, which would route the signal to the intended protocol agent. For example, the signal described above would be retrieved by protocol agent 307 and the information within would be stored in the appropriate FIFO.

After information is stored within the FIFOs of a particular protocol agent, the protocol agent may process the cache events sent by the cache agent in accordance to the coherence protocol by retrieving, or "popping," the information off of the FIFO in the order in which it was stored.

Ordering Rules

As discussed above, because the cache agents (e.g., cache controllers) are separate from the protocol agents, the coherence ordering point is not at the same location, particularly since there is a non-one-to-one mapping between cache controllers and protocol engines with a variable latency Chip Multi Processor (CMP) network, or alternatively a variable latency network on-chip, off-chip, or implemented in software, in between.

More specifically, a cache controller performs cache actions, such as requests, writebacks, snoops, and fills in an internal order, and when applied in a sequence to a single block in the cache, results in the data and state of the block to be updated in the order according to the specific sequence. This ordered sequence of cache events is important to correctly implement the coherence protocol. For instance, in one embodiment, the communication of correct cache ordering allows snoop responses and new requests to be seen in the correct order by the detached protocol engine, providing it the visibility into the internal ordering at the cache controller for these events, to ensure that a snoop doesn't incorrectly get reordered behind a request and become blocked as specified in one embodiment of a coherence protocol.

The cache ordering point is where cache events, such as snoops, request, writebacks, and fills, are ordered with respect to one another. The coherence ordering point is where coherence decisions are made from events specifically necessary to implement the protocol state transitions. These events include the cache events set forth herein, which are brought into the protocol agent in the correct cache event ordering via the pre-coherence channel, along with external coherence events, which reflect the communication of the coherence view from other protocol agents in the system.

In one embodiment, the cache ordering point is made to appear as if it's located inside the protocol agent, which is located apart from the cache controller. To do that, information contained in the cache agent's ordering point is shifted into the coherence ordering point via the pre-coherence channel. That is, the pre-coherence channel gives a protocol agent a view into the internal ordering at the cache agents, allowing the protocol agent to function in a detached way without violating coherence rules in the coherence protocol. In one embodiment, the pre-coherence channel consists of an ordered mechanism to transport cache events from the cache agent into the protocol agent, and includes recovery and ignore mechanisms to allow a consistent coherence view of the system. The pre-coherence channel also includes a mechanism where resource dependencies are resolved by blocking the pre-coherence channel or moving the blockage to another FIFO to unblock the pre-coherence channel.

In one embodiment, the pre-coherence channel is implemented as a virtual ordered route by which cache specific information is communicated from the cache agent into the specific logic that maintains the system interface's coherence ordering point, which is a request inflight table referred to herein as the Missing Address File (MAF), located in the protocol agent. Physically, this virtual route is implemented as the CMP network, and egress and ingress buffering on either side of the network within the cache and protocol agents respectively leading from the cache control logic to the MAF. The CMP network is the link and physical layers of the an on-chip communication consisting of the CMP address, acknowledgement, and data networks, between cache agents, processors, and protocol agents, shown as the collective of the bus network and its routing components in FIG. 3.

In one embodiment, the protocol agent has two pipelines: one of the system interface-bound path and one for the CMP-bound path. The one for the system interface path consists of request and snoop responses that operate on the Missing Address File (MAF) structure, which is the unit most responsible for enabling the separation between the cache agents and the protocol agents while maintaining ordering. The MAF provides a single point of ordering from the system interface perspective, which allows for conflict resolution. In one embodiment, the MAF exclusively keeps track of state information required for coherence completion of transactions, snoop blocking, and for manipulating in-flight data from cache controllers. The CMP-bound path consists of structures that handle snoops and responses. A Probe Queue (PRQ) structure provides a mechanism to block and replay snoops wherein the decision to do so is controlled via the MAF, as required by one embodiment of the protocol.

In one embodiment, the following message types communicate the ordering point from the cache controller into the system interface: requests, writebacks, data (fill) acknowledgements, and snoop responses. These messages come into the protocol agent as a single input stream of events. From the dependency point of view, in one embodiment, they are classified into three types: simple flow dependency, cyclic resource dependency, and acyclic resource dependency.

For a simple flow control dependency, data acknowledgement and snoop responses do not require allocation of a resource in order to be consumed. In one embodiment, they both could potentially create home channel messages, which are sunk in preallocated buffers in the home node of the system, without requiring additional dependency aside from message flow control. (The home node may be part of the memory controller in a system responsible for handling the semantics of the transactions that the memory controller deals with over the network connecting each of the processors in the system to the memory controller, and these transactions are used to implement a coherence protocol in which these processors and the home node coupled with the memory controller jointly participate.)

For a cyclic resource dependency, requests depend on the allocation of a resource. In one embodiment, because resource sharing (as opposed to resource division) is allowed, a request may not have a free MAF entry to allocate. In order to make room for allocation, another entry needs to retire, and for that to occur, snoops need to make forward progress. If a request is blocking the input event stream, then snoop responses behind the request are prevented from making forward progress. As long as snoop responses are blocked, the protocol agent cannot complete requests, and request entries in the MAF will not retire, which is a deadlock condition. Request allocation depends on request forward progress, which depends on snoop forward progress, which depends on the event stream making forward progress, which is blocked by the request. In one embodiment, a cyclic resource dependency is resolved by moving blocked requests into another buffer, freeing the input events that were blocked behind it.

For an acyclic resource dependency, writeback transactions also have a resource dependency on allocation into the MAF. While waiting on a MAF entry to become available, the input stream from the cache agent is also blocked. However, this is a benign resource dependency because writeback forward progress is not dependent on the any messages behind it, namely, a snoop response message following it from the cache agent. As long as there is a reserved writeback allocation path into the MAF, writebacks can achieve still forward progress even by blocking the input event stream.

Figure 4:
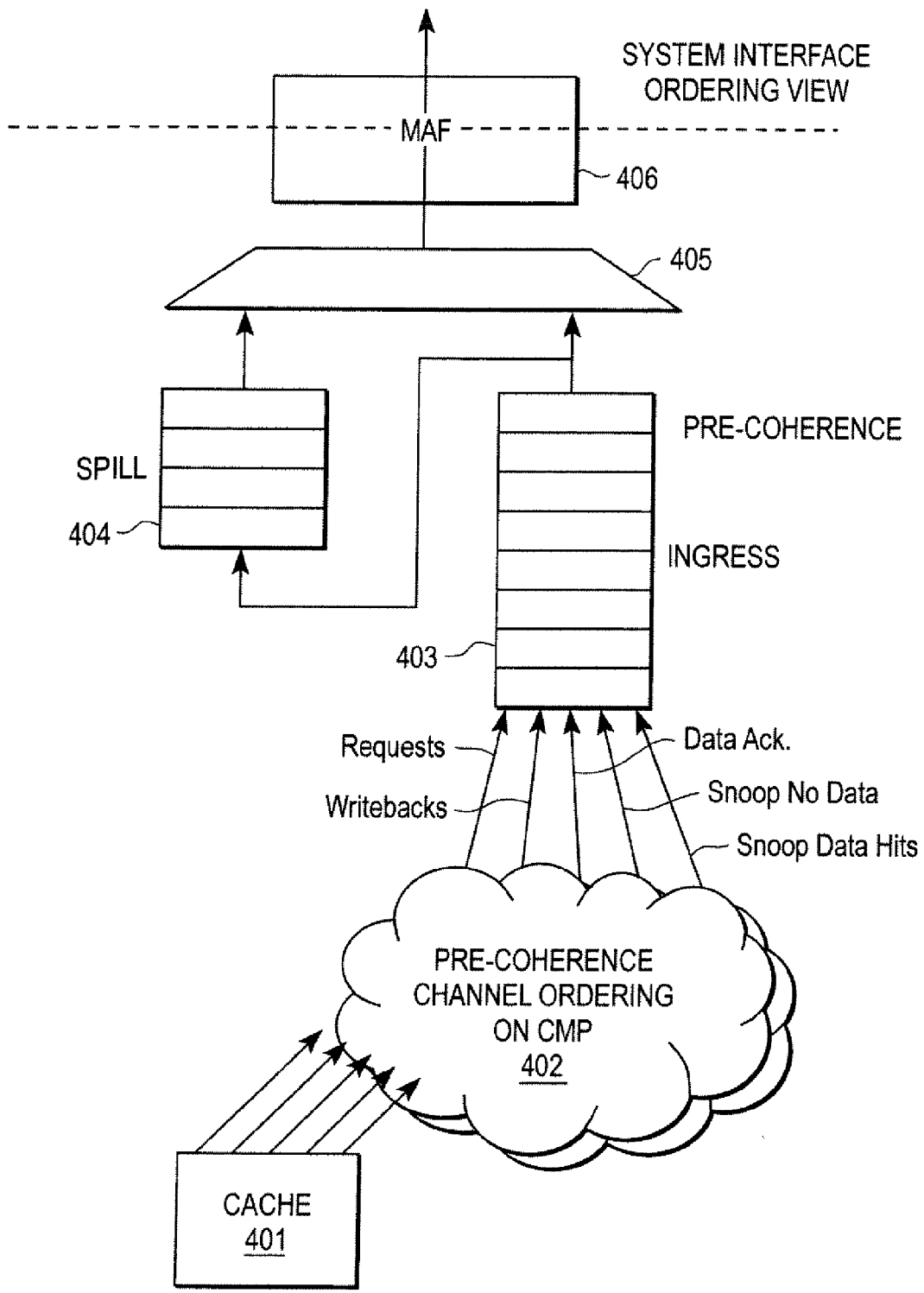
FIG. 4 illustrates a block diagram of one embodiment of message ordering logic to accommodate the various message types while ensuring proper ordering.

FIG. 4 is a block diagram of one embodiment of message ordering logic to accommodate the various message types while ensuring the proper ordering of the cache coherency events. In one embodiment, this logic is in the protocol logic. The ordering logic uses two separate FIFOs and includes the MAF.

Referring to FIG. 4, an incoming stream of events is impact into ingress queue (e.g., FIFO) 403. Such events are received from the pre-coherence channel ordering interface (e.g., rings) between the one or more protocol agents and one or more caches (e.g., cache agent 401) in the sets of caches. These events are received in the form of messages that include requests, writebacks, data acknowledgements, snoop no data messages, and snoop data messages.

The head of ingress FIFO 403 is coupled to one input of arbiter 405. In one embodiment, only the head of ingress FIFO 403 is allowed to arbitrate for input into MAF 406. In one embodiment, non-request events are allowed to block at the head of ingress FIFO 403 while waiting for resources, but if a request is at the head of ingress FIFO 403 and blocked, it is moved into spill FIFO 404 instead, thereby allowing the stream of events following it in ingress FIFO 404 to proceed to avoid deadlock. In one embodiment, the move is done by obtaining an issue slot by doing a poison issue when not all the resources are available. The poison issue is one which is interpreted as a nop elsewhere, but enables allocation into spill FIFO 404.

In one embodiment, spill FIFO 404 is preallocated with the total number of requests from all cache agents from which the protocol agent can receive. In one embodiment, unallocated requests have one way pre-coherence ordering with respect to the other messages. Thus, an unallocated request cannot shift forward in the pre-coherence channel but is allowed to move backwards. In other words, the protocol agent pretends the cache agent request was sent later than it was with respect to snoops following it. Additionally requests are out-of-order with respect to each other. Subsequently, arbiter 405 arbitrates between the outputs of ingress FIFO 403 and spill FIFO 404 for access to MAF 406.

Thus, from the dependency point of view, requirements are made on the reordering of requests in comparison to all other events in the pre-coherence channel ordering. In these reordered cases, reordering is done on the pre-coherence channel where it would not have been allowed in at the system interface. These happen in cases where either the protocol agent is able to recover, or the reordered perception of events do not force the cache and coherence agents to diverge. For more information on one embodiment of the ordering, see Ser. No. 11/221,616, entitled "Pre-Coherence Channel," concurrently filed and assigned to the corporate assignee of the present invention.

In one embodiment, ingress FIFO 403 and spill FIFO 404 in the system interface could be part of the CMP network. All requests, writebacks, snoop responses, and data acknowledgements are explicitly made ordered in the FIFO, even though the pre-coherence channel does not require all of them to be ordered. Request dependency is fixed through spill FIFO 404, which then allows requests to be unordered amongst requests to take advantage of request-to-request out of orderness.

In one embodiment, spill FIFO 404 is not included and ingress FIFO 403 buffers all cache coherence events, provided cyclic resource dependency across requests is resolved in an alternative way. In such a case, arbiter 405 is not necessary.

Once into the protocol agent, all messages are stored into ingress FIFO 403 in the order received, which is the order the cache agent intends. No further reordering of messages occur in ingress FIFO 403 as they are pulled out and sent to be issued into MAF 406 in order under control of arbiter 405. The out-of-orderness introduced on the ring network, but still complying to the pre-coherence channel ordering, is reflected in ingress FIFO 403, along with request out-of-orderness, which is introduced local to the system interface at the FIFO 404, through arbiter 405 across the FIFOs into MAF 406. From that point on, messages travel on the coherence channel on or off-chip between protocol agents in the system.

MAF 406 receives completion messages, according to one embodiment of a coherence protocol, to retire pending coherence transactions stored in its entries. These are received from the home node and may include completion only (Cmp) and completion-forward (CmpFwd) messages. The latter is in the form of an explicit extraction command attached to a normal completion.

Conflict Resolution, Coherence Completion, and Transaction IDs

Separating the cache agents from the protocol agents while trying the preserve ordering of cache coherency events impacts three complex aspects of a coherence protocol from the local CMP protocol that are handled by the MAF. First, with respect to conflict resolution, in one embodiment, this separation allows the local cache agents to be uninvolved in conflict detection, snoop blocking, and/or other specific conflict resolution algorithm used by the off-chip protocol. The MAF keeps tracks of outstanding transactions and blocks snoops during the conflict phase of a transaction. If a snoop occurs, regardless of whether there is an outstanding request from the cache agent, the snoop is processed by the cache agent, independent of the internal conflict state within the protocol agent, if it exists, and while it may be actively servicing snoops, registering conflicts, or blocking snoops. Second, with respect to coherence completion, the local cache agents can be hidden from the handshaking involved in achieving system coherence that is part of many traditional MP coherence protocols. In one embodiment, the MAF keeps track of receiving both a data response and a completion for a transaction to properly retire. This also includes conflict mode completions and completion-forwards in which the protocol requires the data to be extracted and sent to the next requestor. This allows the cache agent to only keep track of data responses without any concern about the coherence protocol handshakes done by the protocol agent in the background to maintain cache coherency. Third, with respect to transaction IDs, in one embodiment, the transaction IDs are kept separate from cache transactions IDs. The MAF hides the transaction IDs from the cache agents so they are not involved in their assignment and how these resources are shared with other cache agents. The logic in FIG. 4 translates between the two transaction domains.

In one embodiment, the following is the order that the cache operations come into the MAF. Based on the coherence rules of ordering and dependency, logic in the MAF determines what the consistent view is of the cache coherency.

During a new request phase of a transaction, a transaction can receive either a completion (Cmp) message or a FrcAck-Cnflt type message from a home node to force registration of a conflict at a protocol agent upon a home node's detection of it, or a DataAck message from the local cache controller responsible for the memory address. DataAck is sent by the local cache controller to acknowledge a fill of the data when the data contained in a data response (DataC_*) message becomes visible in the cache. In one embodiment, any snoop response received during a request phase of a transaction is converted to conflict snoop response (RspCnflt) messages to signal detection of a conflict to a home agent during a snoop at a protocol agent, and the entry in the MAF is marked so it enters the conflict phase upon exiting the request phase states of a transaction.

Once both a Cmp and a DataAck message are received by the MAF, the MAF may retire one of its entries, which was originally created as a result of one of the cache events, if there is no Conflict detected as part of the conflict phase; otherwise, the MAF sends an AckCnflt to the home to initiate home node conflict handling, and to enter the request conflict phase. Within the conflict phase, any snoop (via returning snoop responses from cache agents) is registered in the MAF for snoop buffering. Additionally, in one embodiment, in the Wait for Cmp or Conflict states, data has already been filled into the cache while the protocol agent is in request phase (conflict registered or not), or in conflict phase, respectively, and the data filled into the cache may be replaced, resulting in a writeback, or it may be extracted by a snoop, resulting in a snoop hit data response. The MAF buffers data in these cases until either the home requests the data to be explicitly forwarded in a completion-forward (CmpFwd) message, or the transaction completes on a non-forwarding Cmp, which causes the existing MAF entry to convert to a writeback transaction. Transitioning out of the Conflict state also causes buffered snoops to become unbuffered. This is done by replaying the snoops registered in the MAF.

Figure 5:
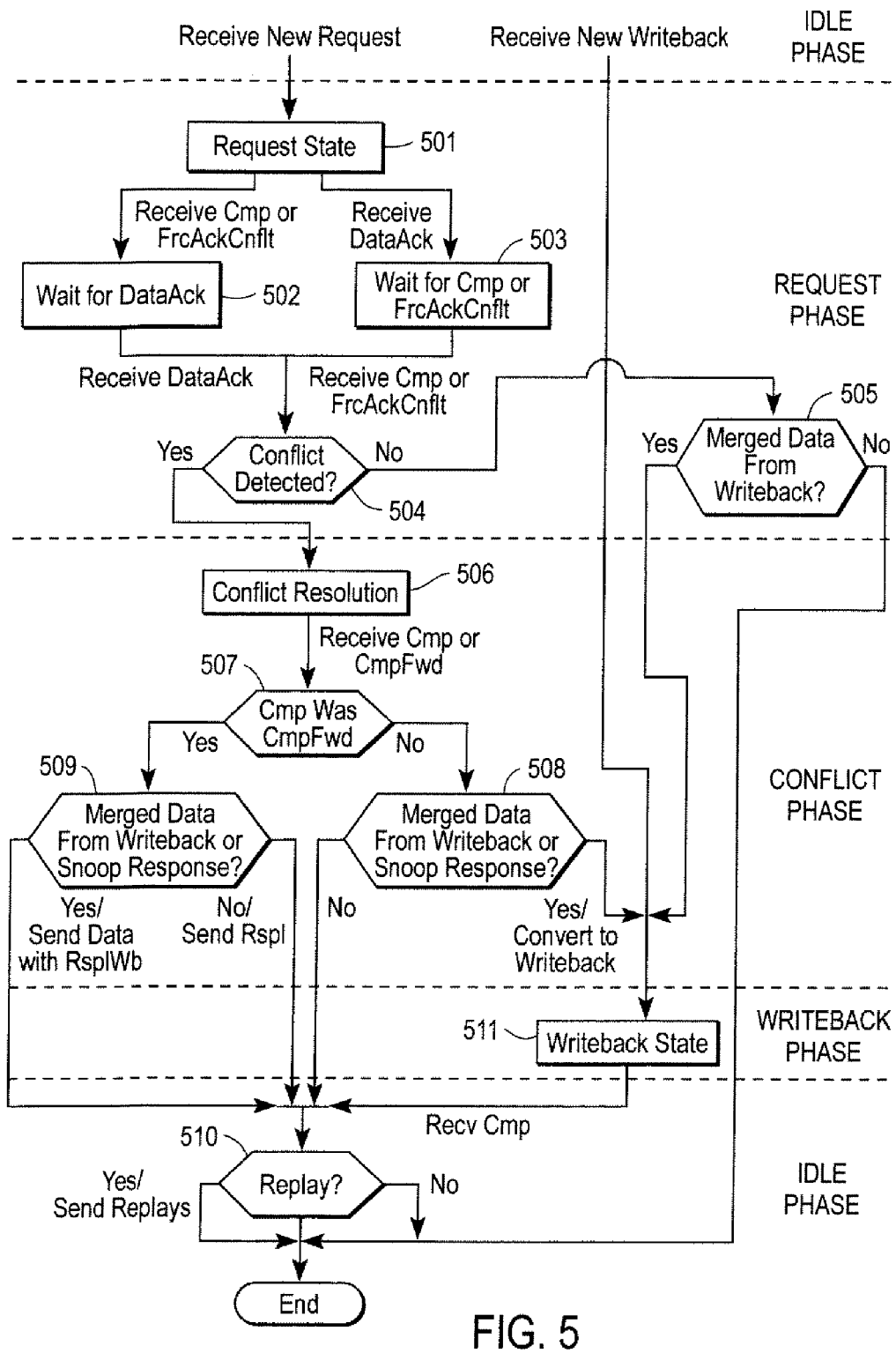
FIG. 5 is a flow diagram of one entry in one embodiment of the MAF.

FIG. 5 is a flow diagram of one entry in one embodiment of the MAF. The process is performed by processing logic that may comprises hardware (e.g., circuitry, dedicated logic, etc.), software (such as is run on a general purpose computer system or a dedicated machine), or a combination of both, including firmware.

Referring to FIG. 5, during the idle phase, processing logic at the protocol agent may receive a new request or a new writeback operation from the cache agent. In one embodiment, if processing logic receives a request, the MAF enters the request phase in which the request is handled, while if processing logic receives a writeback request, the MAF handles writeback in the writeback phase.

Upon receiving a new request, processing logic determines the request state (processing block 501). If during the request state, the transaction receives a completion (Cmp) or a force acknowledgement conflict (FrcAckCnflt), then processing logic transitions to processing block 502 and waits for a data acknowledgement (DataAck). If the transaction receives a data acknowledgement (DataAck), then processing logic transitions to processing block 503 and waits for a Cmp or a FrcAckCnflt.

In response to receiving DataAck or a Cmp or a FrcAck-Cnflt, processing transitions to processing block 504 wherein processing logic determines whether a conflict has been registered in the life time of the transaction leading up to this point. A conflict is registered when a snoop response to the same (conflicting) cache block is processed by the MAF during the interval. If a conflict is not detected, processing logic determines if there is merged data from a writeback (processing block 505). In one embodiment, writebacks may be issued by the cache agent as soon as the data is filled into the cache, as signaled by the sending of the DataAck message in processing block 501, leading into 503, during which the writeback arrives, prior to the transition into processing block 504. If the writeback occurs during the request phase, processing logic transitions to processing block 511. If not, processing logic ends processing and the transaction completes.

If processing logic detects a conflict at processing block 504, processing transitions to processing block 506 where processing logic performs conflict resolution in conjunction with the home node, which includes initiating a conflict phase via an AckCnflt message to the home, blocking snoops that had been processed by the cache agent, whose snoop responses arrive during the interval, and merging data that arrived as a result of either dirty snoop responses or writebacks from the cache agent into the transaction. As a result of performing conflict resolution, processing logic outputs a completion (Cmp) or a completion-forward (CmpFwd), which has an additional embedded explicit forward, to terminate conflict resolution.

At the termination of the conflict resolution process, the processing logic determines whether the completion was a CmpFwd (processing block 507) or a plain Cmp. If the completion was a CmpFwd, then processing logic checks if there has been data merged into the transaction during conflict resolution from either a writeback or a dirty snoop response (processing block 509). If so, processing logic sends the merged data as a snoop hit response with an attached writeback to home (RsplWb) and processing transitions to processing block 510. If not, processing logic send a snoop miss response (Rspl) and processing transitions to processing block 510.

If the complete was not a CmpFwd, which implies it must be a Cmp, then processing logic checks if there has been data merged into the transaction during conflict resolution from either a writeback or a dirty snoop response (processing block 508). If so, processing logic converts the transaction into a writeback, taking the merged data, and processing transitions to processing block 511. If not, processing logic transitions to processing block 510.

In one embodiment, processing blocks 506-509 occur in the conflict phase.

At the writeback phase, the writeback is performed via issue to the home node.

At processing block 510, processing logic determines whether replay is necessary. A replay is performed on all blocked snoops, which have been processed by the cache agent and targeted the same (conflicting) cache block during the conflict and writeback phases of a transaction. These blocked snoops are registered in the MAF for replay during the replay phase, which causes the snoop command that had been halted to be retried. If replay is not to occur (i.e. no blocked snoops), the process ends. If so, processing logic sends the replay and then the process ends.

Conflict Resolution Abstraction

In one embodiment, there is no concept of conflicts at the cache agent. The cache agent does not detect if a snoop occurs while one of its transactions is in-flight. The snoop response is preserved in order with requests, writebacks, and data acknowledgements along the pre-coherence channel via the cache agent egress path, the CMP network, the protocol agent's ingress path, and eventually into the MAF. The pre-coherence channel path from the cache agent into the MAF is deployed to bring the cache ordering point into the MAF, which is the system ordering point. The cache ordering point infers the following relationships critical to conflict resolution: (1) snoops occurring with respect to requests or writebacks; and 2) snoops occurring with respect to data acknowledgements. Having snoops occur with respect to request and write backs allows the conflict resolution logic in the protocol agent to detect whether snoops conflict or not with requests or writebacks. Since data acknowledgements can trigger the MAF to transition into conflict phase, snoops occurring with respect to data acknowledgements decides whether snoops are true conflicts or are captured for replay to satisfy the snoop blocking condition in one embodiment of a coherence protocol.

The ordering point at the MAF additionally infers a relationship between the completion and snoop responses for the same purpose of conflict phase transition boundary detection.

The protocol agent waits for a completion and a data acknowledgement before entering the conflict phase. Thus, in one embodiment, snoop conflict handling depends on when a conflict occurs in relation to the conflict phase transition boundary. Prior to entering the conflict phase, the protocol agent replies with a response conflict. Once in the conflict phase, blocking occurs until a replay (in which the snoop is retried).

Figure 6:
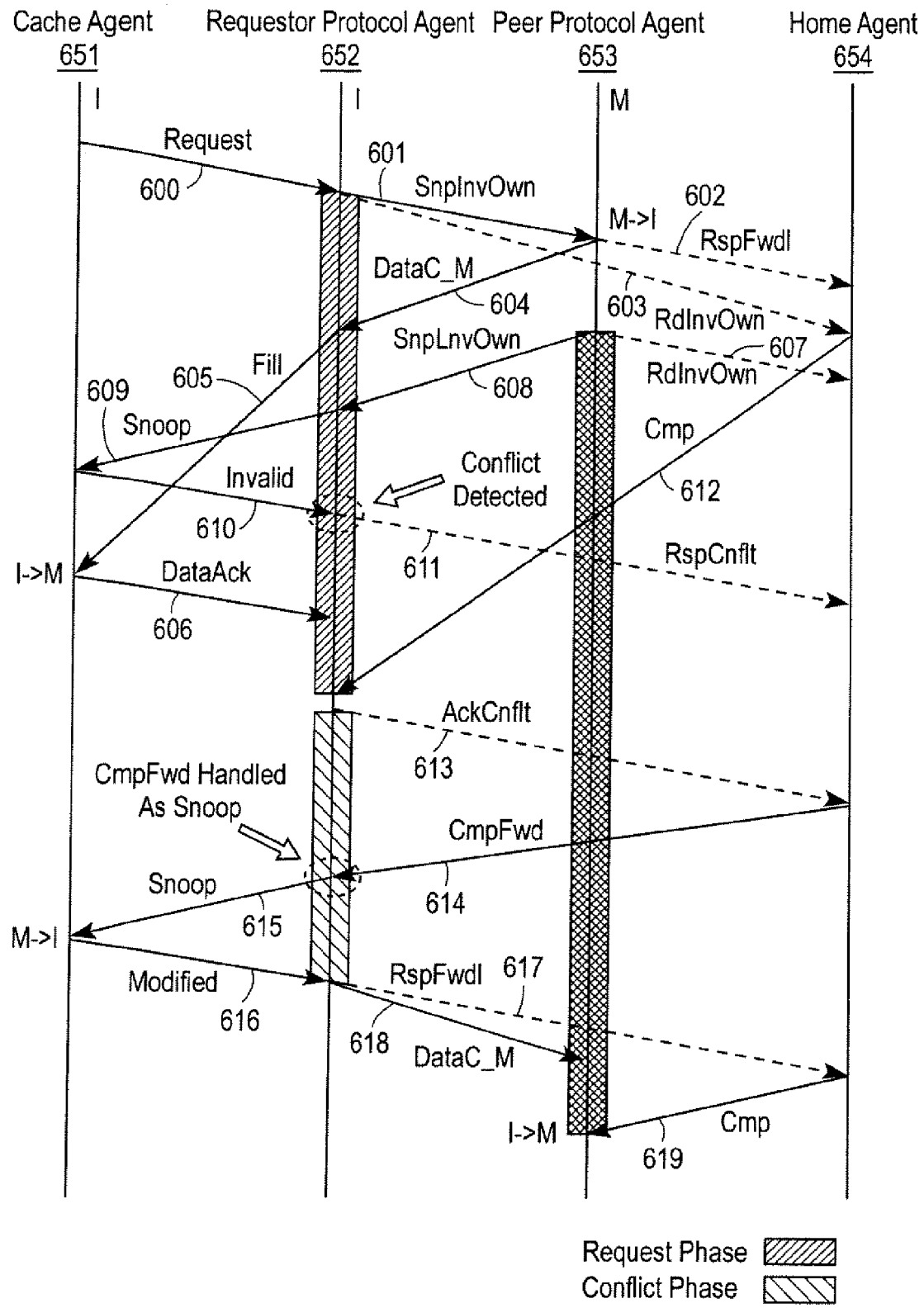
FIG. 6 illustrates a flow diagram illustrating how a request is processed where a conflict is generated in a protocol agent without the conflict being exposed to the underlying cache agent.

FIG. 6 illustrates a flow diagram illustrating how a request is processed where a conflict is generated in a protocol agent without the conflict being exposed to the underlying cache agent. In one embodiment of a coherence protocol, the dotted line messages are communicated on an in-order network, which the solid line messages are communicated without ordering constraints. Referring to FIG. 6, the flow begins with a cache agent 651 issuing a request 600. Request 600 is received by the requester protocol agent 652, which turns request 600 into two parts: (1) a snoop operation, referred to as SnpInvOwn 601, to peer protocol agent 653, and (2) a read request, referred to as RdInvOwn 603, on an ordered channel to home agent 654.

The snoop operation SnpInvOwn 601 is received by peer protocol agent 653. In this example, the data is in the modified state. Therefore, the peer protocol agent 653 changes the cache coherency state from modified to invalid, sends a response forward, RspFwd 602, to home agent 654, indicating to the home agent that data was implicitly forwarded to the requester, and sends the data response in modified state to the requester protocol agent 652, shown as DataC_M 604. Requester protocol agent 652 forwards the data as Fill 605 to cache agent 651, which takes a long time to reach it, but when it does reach there, it changes the coherency state from invalid (I) to modified (M). Cache agent 651 also sends a data acknowledgement, DataAck 606, to requester protocol agent 652.

Note that home agent 654 issues a complete, Cmp 612, which takes a long time to return to requester protocol agent 652. During that time, peer protocol agent 653 issues a two-part request and snoop operation, consisting SnpInvOwn 608, to requester protocol agent 652, and RdInvOwn 607, to home agent 654. That is, after the data has been extracted from peer protocol agent 653, it makes another request for that data. Requester protocol agent 652 sends the snoop operation SnpInvOwn 608 on to cache agent 651 as Snoop 609, which beats Fill 605 in arriving at cache agent 651. Cache agent 651 responds with an Invalid 610 since it has not received the data yet as part of Fill 605. Requester protocol agent 652 receives Invalid 610 and detects a conflict. Thus, because of the time delays that may occur, cache operations can become out of order. In response thereto, requester protocol agent 652 issues a response conflict, ResCnflt 611, to home agent 654, due to the conflict occurring during request phase of its transaction.

After requester protocol agent 652 receives the complete, Cmp 612, it recalls the previous conflict event caused by Invalid 610, and initiates conflict phase of the transaction by sending AckCnflt 613 to home agent 654. In response to this acknowledgement and recognizing peer protocol agent 653's part in the chain of conflicts, home agent 654 issues a completion-forward, CmpFwd 614, to requester protocol agent 652, granting it completion of the transaction, along with an instruction to explicitly forward it data it owns to peer protocol agent 653. Requester protocol agent 652 handles the completion-forward as a snoop and issues a snoop operation, Snoop 615, to cache agent 651. Cache agent 651 changes the cache coherency state of the data from modified to invalid, extracts the data, and sends that along with an indication that the data is in a modified state, Modified 616, to requester protocol agent 652. In response thereto, requester protocol agent 652 sends the data, as DataC_M 618, to peer protocol agent 653, as well as a response forward, RspFwd 617, to home agent 654. In response thereto, home agent 654 sees no additional conflict chained up behind that of the peer protocol agent 653, and issues a completion, Cmp 619, to peer protocol agent 653. In response thereto, peer protocol agent 653 changes the cache coherency state from invalid to modified.

Coherence Completion Abstraction

A non-forwarding Cmp message may either retire the MAF entry or extend the life of the entry into Conflict phase. However, in the case of a CmpFwd, in one embodiment, the requester agent extracts the cache block to which it just acquired ownership and forwards it to the next owner. The protocol agent injects a snoop into the cache agent to extract the block before retiring.

The cache agent retires a transaction upon receiving a data response (DataC_* message). At that time, the cache agent is allowed to immediately cause a writeback or to extract the data for any incoming snoop. The MAF entry, on the other hand, can still be alive either in conflict phase, or could even be waiting for the initial Cmp message from the home agent in Wait for Cmp state. In one embodiment, the following rules apply when a writeback or a snoop hit data response merges into the MAF. First, with respect to the Wait for Cmp state, if data state is modified, as in the case of a writeback or a snoop response hitting on the modified data, it is buffered for the MAF entry (data buffer is one-to-one relation with MAF); if clean as allowed by a snoop response hitting on non-modified data, then any data associated with the snoop response is dropped. In either case, a RspCnflt is sent instead. Second, with respect to the conflict phase, the same occurs as discussed above with respect to the conflict resolution except no snoop response is sent. Instead, the snoop is registered in MAF for replay to satisfy snoop blocking rule.

Eventually, one of the two things occurs to the buffered modified data. The home agent sends a non-forwarding Cmp message. In this case, the transaction is complete from the coherence protocol perspective, but the MAF entry is not yet done. The MAF entry reuses the transaction ID and converts the entry to a writeback, which is identical to a spontaneous cache agent writeback from the coherence protocol point of view. Alternatively, the home agent sends a CmpFwd message. This causes an extraction snoop to be created to target the cache agent. However, since the modified data is already in the protocol agent, it will come back from the cache agent as a miss. At this time, the snoop miss response is converted to a RsplWb snoop response with data coming out of the protocol agent data buffer.

Because the data may be obtained separately (i.e. in different messages) from the completion flow that is only visible to the protocol agent, the cache agent can retire an entry in its MAF independently, and prior to the finishing of the completion flow at the protocol agent. However, the cache agent may later be forced to send the data to the next owner if the protocol agent happens to be involved in a chain of conflicts, as represented by the completion-forward flow. In such a case, the cache agent invalidates and/or extracts its entry.

Figure 7:
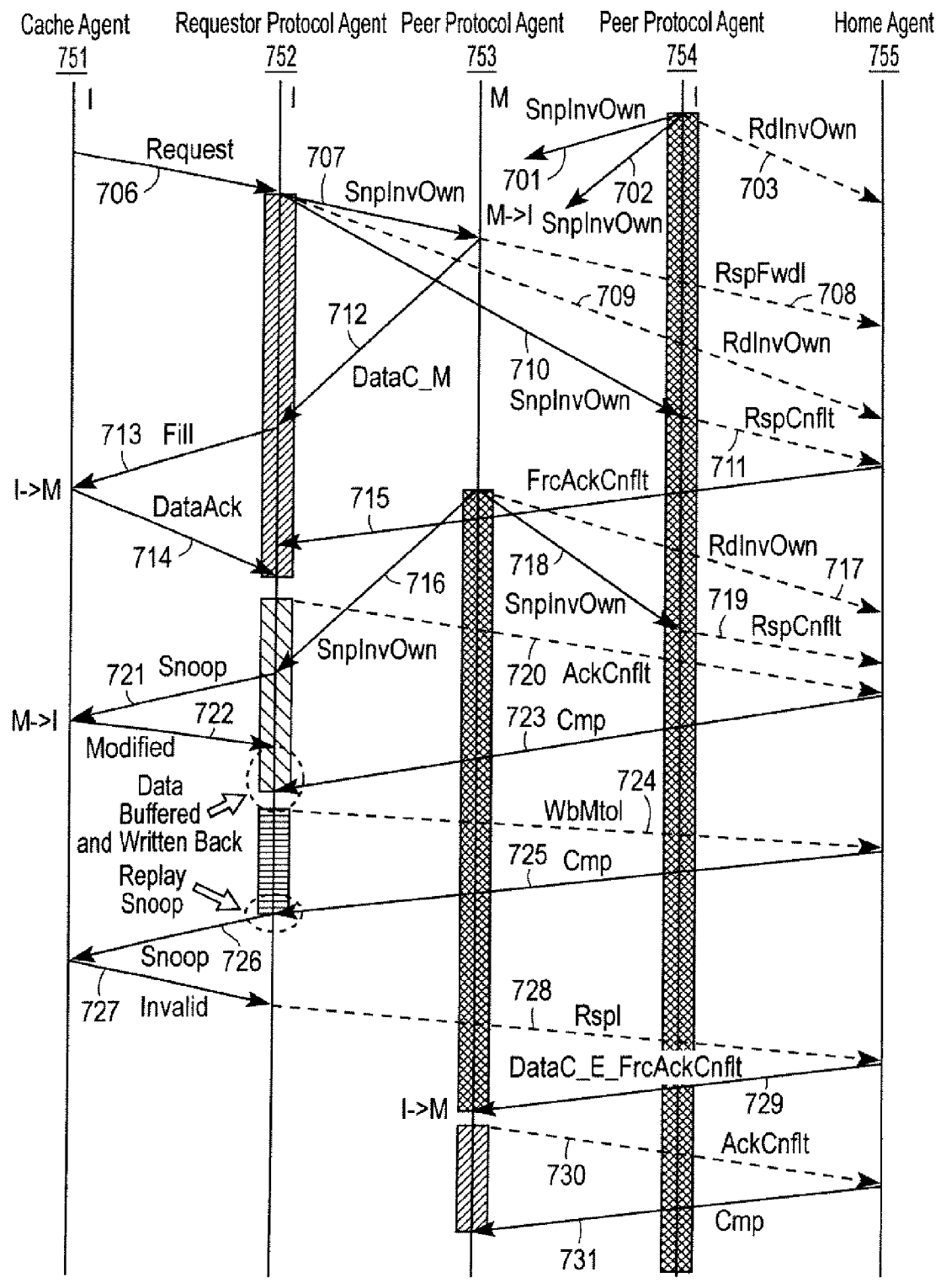
FIG. 7 is a flow diagram illustrating one embodiment of the system where a protocol agent handles the coherence completion of a transaction without exposing this aspect of the coherence protocol to the underlying cache agent.

FIG. 7 is a flow diagram illustrating one embodiment of the system handling accesses when there are two requests to the same address outstanding. In such a case when the second request is a snoop or writeback data request, then any data response to these by a cache agent may be delayed until a completion to the earlier outstanding request to that address has been received by the agent. The completion may be a non-forwarding completion or a completion-forward. Note that a completion-forward is the same as a non-forwarding completion, except where the data message involved is also to be sent to the next home. Allowing a cache agent to initiate a writeback process a snoop without consideration of completion at the coherence protocol level allows a protocol agent to handle the coherence completion of a transaction without exposing this aspect of the coherence protocol to the underlying cache agent.

Referring to FIG. 7, peer protocol agent 754 initiates a transaction consisting of three parts. a read request message RdInvOwn 703 is sent to the home agent 755 and arrives there, and pair of snoop operations, referred to as SnpInvOwn 701 and SnpInvOwn 702 are sent on a network to a requester protocol agent 752 and a peer protocol agent 753, and because of network routing delays or other delays thereof, have not arrived at the destinations. At a short time later, cache agent 751 issues a request 706. Request 706 is received by the requester protocol agent 752, which allocates request 706 into its MAF, and sends out a three part transaction command, consisting a snoop operation, referred to as SnpInvOwn 707, that is sent to peer protocol agent 753, another snoop operation, referred to as SnpInvOwn 710, that is sent to peer protocol agent 754, and a read request, referred to as RdInvOwn 709, to home agent 755.

The snoop operation SnpInvOwn 707 is received by peer protocol agent 753. In this example, the data at the cache agent co-located with peer protocol agent 753 is in the modified state. Therefore, the cache agent changes the cache coherency state from modified to invalid, and peer protocol agent 753 sends a response forward, RspFwdI 708, to home agent 755, and sends the data, shown as DataC_M 712, as a data response to the requester protocol agent 752.

Separately, at peer protocol agent 754, in response to the snoop operation SnpInvOwn 710, peer protocol agent 754 sends a response conflict message, RspCnflt 711, to home agent 755.

Requester protocol agent 752 forwards the data as Fill 713 to cache agent 751, which changes the coherency state from invalid (I) to modified (M). Cache agent 751 also sends a data acknowledgement message, DataAck 714, to requester protocol agent 752, and completes its request transaction, even though the same transaction is still not yet completed at requester protocol agent 752, which will initiate its conflict phase and wait for coherence completion. As described, coherence completion is hidden from the cache agent.

At approximately the same time to requester protocol agent 752 receiving DataAck 714, home agent 755, upon receiving the RdInvOwn 709 request from requester protocol agent 752, and snoop responses from both of the peer protocol agents 753 and 754, home agent 755 may process the transaction from request protocol agent 752 for which these messages are associated. Because of the earlier reception of a RdInvOwn 703 message associated with peer protocol agent 754's transaction, home agent 755 sees a chain of conflicts with request protocol agent 752's transaction being the first in the chain to become ready to process, and sends a force acknowledgement conflict message, FrcAckCnflt 715, to requester protocol agent 752, to force it to register the conflict. In response thereto, requester protocol agent 752 now recognizes that a conflict exists because there are two outstanding transactions for the same address, and sends an acknowledgement conflict message, AckCnflt 720, to home agent 755. By doing so, requester protocol agent 752 enters the conflict phase and will start blocking snoops and data. That is, by recognizing that a conflict exists, requester protocol agent 752 will not provide results to any snoop or writeback to that same address until the earlier transaction completes. At this point, requester protocol agent 752 is waiting for a completion from home agent 755.

Also prior to requester protocol agent 752 entering conflict phase, peer protocol agent 753 issues a transactions that result in snoop operations to requester protocol agent 752, referred to as SnpInvOwn 716, and peer protocol agent 754, referred to as SnpInvOwn 718, along with a read request message RdInvOwn 717. In response to the snoop operation SnpInvOwn 718, peer protocol agent 754, in its request phase, sends a response conflict, RspCnflt 719, to home agent 755.

In response to the snoop operation SnpInvOwn 716, requester protocol agent 752 issues a snoop, snoop 721, to cache agent 751, which, unaware that the transaction is still active in requester protocol agent 752 due to coherence completion abstraction, changes the cache coherency state of the data from modified to invalid, extracts the data, and sends a message, Modified 722, to requester protocol agent 752.

Because the message Modified 722 arrives prior to the complete Cmp 723 during conflict phase, the data is buffered by requester protocol agent 752, while the snoop is also captured and blocked for later replay. Subsequently, an in response to receiving AckCnflt 720, home agent 755, seeing no other conflicting transaction with all request and snoop response messages associated with it, sends a non-forwarding completion message, Cmp 723, to requester protocol agent 752. Once Cmp 723 has been received, requester protocol agent 752, knowing it has data buffered in association to the transaction to which Cmp 723 corresponds writes back the data, with WbMtoI 724 to home agent 755. In response thereto, home agent 755 sends a completion, Cmp 725, to requester protocol agent 752, which completes the transaction associated with Request 706, which initiates replay on all snoops that were blocked during the conflict phase. This includes the snoop from, SnpInvOwn 716, which the requester protocol agent 752 replays and issues as Snoop 726 that is sent to cache agent 751. In response thereto, cache agent 751 sends an invalid message, Invalid 727, to requester protocol agent. Requestor protocol agent 752 sends a snoop miss response, RspI 728, to home agent 755, in response to receiving Invalid 727.

Home agent 755, receiving the RspI 728, along with RspCnflt 719 and RdInvOwn 717 associated with peer protocol agent 753, sends a data force acknowledgement conflict message, DataC_E_FrcAckCnflt 729 to peer protocol agent 753 in response to its transaction. In response thereto, peer protocol agent 753 changes the cache coherency state of the data in its cache from invalid to modified and sends an acknowledgement conflict message, AckCnflt 730, back to home agent 755. In response thereto, home agent 755 sends a completion message, Cmp 731, back to peer protocol agent 753.

An Example of a Protocol Agent

Figure 10:
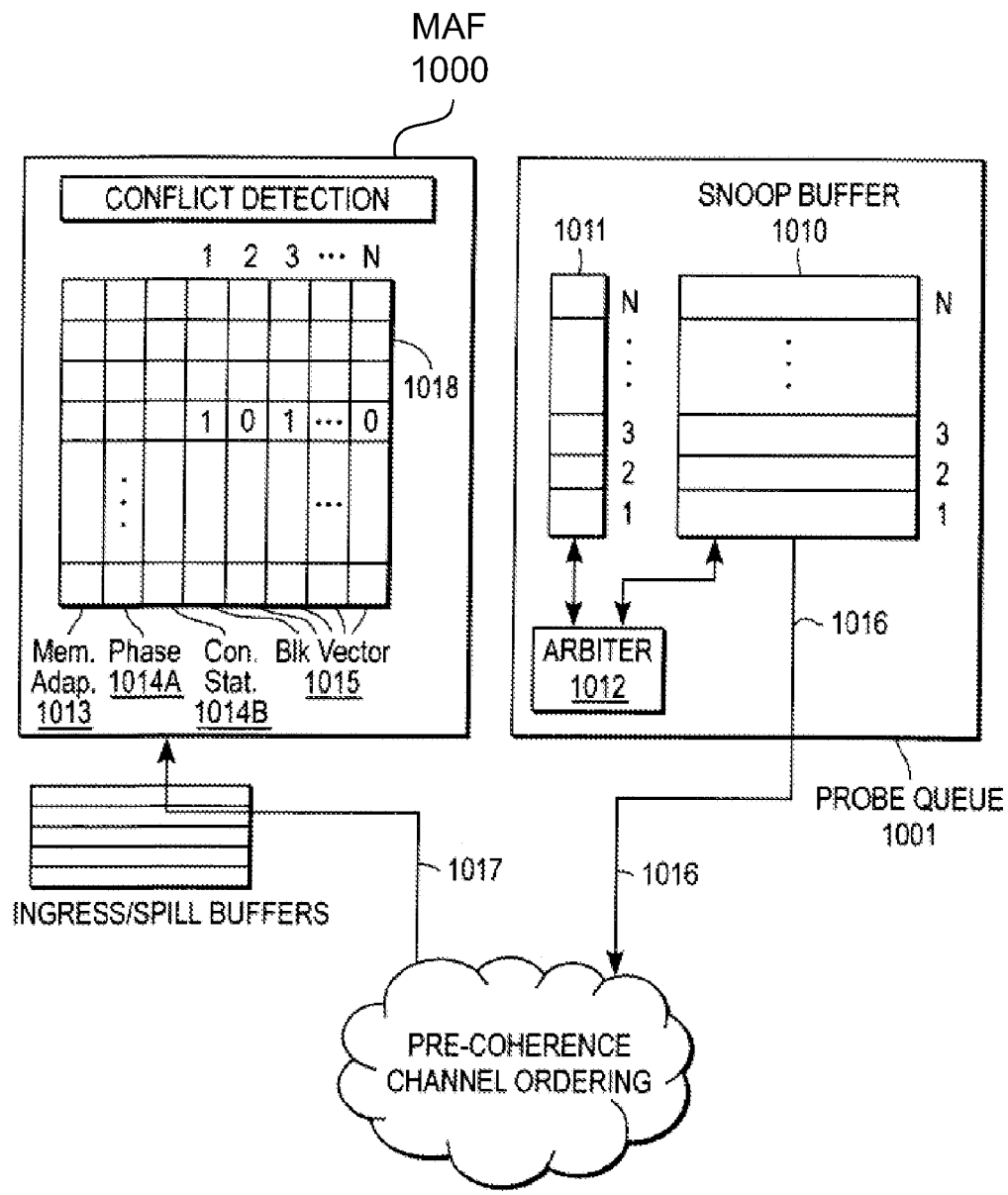
FIG. 10 illustrates a block diagram of one embodiment of a protocol agent.

FIG. 10 is a block diagram of one embodiment of a protocol agent that includes a MAF, a probe queue 1001, and ingress and spill FIFOs. Referring to FIG. 10, MAF 1000 identifies each transaction in a tabular form using a memory address column 1013, which may be implemented with memory such as a Content Addressable Memory (CAM) to detect matching conflicts, a phase status of the transaction (phase status column 1014A), whether or not a conflict exists for that transaction (conflict status column 1014B) and which entries in the snoop buffer 1010 of probe queue 1001 correspond to snoop requests from remote protocol agents that conflict with that transaction (block vector 1015). Probe queue 1001 issues snoops to the cache agent via a network, from which snoop responses also return from cache agents back into the ingress FIFO in the protocol agent. Each snoop response has an identifier (e.g., the memory address itself or a reference to lookup the address) that enables potential association with a specific row in MAF 1000 if in a conflict situation. The same network is also used to send other cache events, such as requests, writebacks, and data acknowledgments from the cache agent into the ingress FIFO and/or spill FIFO before being associated with a MAF entry.

If the snoop response from a cache agent does not match against any outstanding transaction, it is permitted to enter the system network for communication with one or more other devices (e.g., a processor, a memory controller, etc.) and its entry in the ingress buffer or spill buffer is cleared. If it matches, but the transaction is not in conflict phase, it is permitted to enter system network, its entry in ingress buffer or spill buffer is cleared, and additionally, the conflict status is marked to cause the transaction to transition to conflict phase later. If the snoop response a caching agent finds a matching transaction in conflict phase, the block vector 1015 is updated for the transaction. In one embodiment, the data structure that issues from the ingress buffer or spill buffer as the snoop request includes some identifier of the entry of snoop buffer 1010 from which the snoop request issued. If a conflict phase conflict exists for the transaction to which the snoop response generated from a particular snoop request issue from its buffer pertains, a bit is set in the block vector 1015 for that transaction that identifies the entry of snoop buffer 1010 from which the snoop request issued. Essentially, in an implementation, block vector 1015 takes the form of a one hot encoded vector where each vector bit position corresponds to a different entry position in snoop buffer 1010. That is, block vector 1015 indicates which snoop request entries in snoop buffer 1010 belong to the block vector's corresponding transaction. Thus, if a "stream" of snoop responses are issued from one or more of the caching agents for the same transaction in conflict, the block vector will be updated for each snoop response in the stream to reflect its position in snoop buffer 1010. In one embodiment, snoop responses from cache agents that are associated with a transaction in conflict are essentially "killed" by the MAF once the block vector for the transaction is updated as they would have been "blocked" if the conflict for the snoop requests was flagged before cache snooping. In another embodiment, the conflicting snoop requests are flagged before cache snooping, and are either "blocked" in the block vector 1015 in the MAF entry, or "blocked" in a similar structure elsewhere inside the protocol agent, such as in the probe queue.

Eventually, the conflict for the transaction will be resolved and its associated block vector will be logically merged with an arbitration vector 1011 (e.g., logically ORed if the arbitration and blocking vectors use positive logic) to produce a new arbitration vector that "frees" the snoop requests again by allowing it to be picked to be sent on a network to the cache agent.

All conflict information in the now completed transaction will be erased. At this point, the arbitration logic 1012 is free to select any one of them for issuance, irrespective if the snoop request was a replay vs. a first time issue. When any one of these snoop requests is selected for re-issuance to cache, the protocol agent guarantees the corresponding snoop response transaction will not conflict upon it being provided by the cache agent, and the snoop response is permitted to proceed and its corresponding snoop request in snoop buffer 1010 is cleared.

The arbitration vector 1011 identifies which snoop request entries within either the probe queue are free to issue (e.g., the vector is implemented as a one hot encoded vector of dimension N in which a "1" in a specific bit position of the vector indicates that its corresponding entry in snoop buffer 1010 is free to issue to cache, and, a "0" in a specific bit position of the vector indicates that its corresponding entry in the probe queue is not free to issue to cache). In one embodiment, when an incoming snoop request is initially entered into the probe queue, its corresponding value in the arbitration vector 1011 is set to a value that permits the snoop request to be issued because conflict detection for the snoop request's transaction is not performed, hence, no blocking is performed.

Arbitration logic circuitry 1012 is designed to choose a specific snoop request from amongst the snoop requests within snoop buffer that are identified by arbitration vector 1011 as being available for issuance to the cache. Arbitration logic 1012 is designed to comprehend the network's transaction protocol semantics sufficiently enough to intelligently select a snoop request from snoop buffer 1010 for issuance to cache, at perhaps the expense of keeping snoop requests that entered in snoop buffer 1010 prior to the selected snoop request, in order to enhance the likelihood of avoiding a transaction conflict situation.

After the arbitration logic circuitry 1012 selects a specific snoop request that is free to issue to the network to a cache agent, the selected snoop request will issue from the probe queue. Arbitration logic 1012 also toggles the bit in arbitration vector 1011 that corresponds to the issued snoop request's entry so that the snoop request is no longer free to issue. As described in more detail below, "re-freeing" of the snoop request may be accomplished later if the snoop request's transaction is in conflict.

Thus, a copy of a snoop request is kept in snoop buffer 1010 after the snoop request issues to cache, however, in case a conflict flag is raised for the snoop request subsequent to the snoop into cache being performed. If such a conflict flag is raised, the copy of the snoop request in snoop buffer 1010 is "re-played" into the cache at a later time using a replay mechanism. The copy of the snoop request remains in snoop buffer 1010 until a snoop is performed into cache that is not subsequently flagged as having its associated transaction in a conflict phase.

Transaction ID Abstraction

In one embodiment, a coherence protocol implements a limited transaction id resource that a protocol agent may assign to uniquely identify a coherence transaction in the system. Once all transaction id resources are consumed in a protocol agent, it cannot issue new requests into the system until resources are freed up by completed transactions. The extent of the limit is defined in the various protocol agents and in the system network on top of which the coherence protocol is communicated. This coherence and system level detail is hidden from the cache agents, which are made unaware and thus independent of these details under which the protocol agent functions. This eliminates the requirement on the cache agents to actively share and assign coherence resource such as the transaction id. In one embodiment, the protocol agent keeps a mapping of local cache agent transaction IDs and the coherence protocol level transaction IDs. In one embodiment, requests in the local cache agent transaction ID domains from all cache agents fairly associate their IDs with coherence protocol level transaction IDs at a MAF entry, so resources are effectively shared regardless of the composition of the cache agents within the CMP system.

There are numerous advantages that are applicable to one or more embodiments described herein. One advantage is that it allows each protocol to be optimized for its own intended purposes (e.g., the local protocol is optimized for cache transfer performance, and the off-chip protocol is optimized to support the complex conflict and coherence completion rules). A second advantage is that it allows more effective resource sharing between the local cache agents in a multiple cache agent design. A third advantage is that the local protocol hides on-chip coherence operations from off-chip protocol, so off-chip bandwidth is saved.

An Example of Pseudo Code

The following pseudo-code illustrates the operation of one embodiment of the MAF.

```
If (request is self-poisoned) {
    reject request to spill FIFO
} else if (memory attribute mis-speculation or MAF CAM hit or replay count nonzero) {
    reject request to spill FIFO
    return pre-allocated MAF id to MAF allocator
    if (request memory attribute is coherent memory) {
        return pre-allocated home channel buffer to counter
        return pre-allocated snoop channel buffer to counter
    } else {
        return pre-allocated NCS channel buffer
    allocated request with pre-allocated MAF id
    if (request memory attribute is coherent memory) {
        send request on home channel
        send request to snoop channel
    } else {
        send request on NCS channel
    }
}
Victim Marker/WC-NC-Wr/UC-NC-Wr
If (WC/UC request is self-poisoned) {
    Reject request to spill FIFO
} else {
    Signal IDB ready to IDC with alloc'd id
    Signal move_to_MDB to IDC
    Send MAF id to IDC
    If (victim and MAF CAM hit) { // must be victim merge-in
        Set merge_MDB bit
        Return pre-allocated home channel buffer to counter
        Return pre-allocated MAF entry to MAF allocatore Cmp/pm
        if (!Local_DAck) {
            Set Cnflt bit // force conflt if victim passes dack
        }
```

```
        // else wait for extract pm or Cmp no forward to set MDB ready
    } else if (memory attribute mis-speculation) {
        if (request memry attribute is speculated coherent) {
            return pre-allocated home channel buffer to counter
        } else {
            return pre-allocated NCS channel buffer
        }
    } else { // non-conflict allocation
        set Local_DAck bit
        set Cmp_1 bit
        if (request memory attribute is coherent memory) {
            allocate victim marker with pre-allocated MAF id
            send WbMtoS on home channel
        } else {
            allocate NC write with pre-allocated MAF id
        }
        send MAF id, address, DNID to MDC
        signal MDB ready at MDC
    }
}
Probe Marker
If (!MAF CAM hit) {
    If (probe marker event type is CleanAck or DirtyAck) {
        Send RspFwd [I/S] ot RspFwd [I/S] Wb on home channel
        Signal IDB ready to IDC with alloc'd id
        Send home, origin, origin_state to IDC
        // don't move and don't replay
        // PAF retires PRQ id when IDQ sends data
    } else { // IAck or SAck probe marker
        Send Rsp [I/S] on home channel
        // don't set IDB ready to retire PAF
    }
}
// conflict merge
else {
    // true conflict
    if (!(Local_DAck AND Cmp_1)) {
        Send RspCnflt on home channel
        Set Conflict bit
        If (probe marker event type is DirtyAck) {
            Signal IDB ready to IDC with alloc'd id
            Signal move_to_MDB to IDC
            Send MAF id to IDC
            Set merge_MDB bit
            // PAF retires PRQ id when IDQ sends data
            // don't replay
            // we don't set MDC ready until Cmp*
        } else { // IAck/SAck/CleanAck probe market event types
            // don't set IDB ready to retire PAF
            // we drop data response on CleanAck
        }
    }
    // buffer snoops during AckCnflt /Cmp* handshake in CSI protocol
    else {
        if (probe marker event is for extract probe) {
            // CleanAck/DirtyAck = = probe marker + data response
            If (probe marker event type is CleanAck/DirtyAck) {
                Send RspFwd [I/S] / RspFwd [I/S] Wb on home channel
                Signal IDB ready to IDC with alloc'd id
                Send home, origin, origin_state to IDC
                // don't move and don't replay
                // PAF retires PRQ id when IDQ sends data
            } else { // IAck/SAck probe marker (failed Cmp_Fwd)
                if (merge_MDB) {
                    clear merge_MDB bit
                    send Rsp [I/S] Wb on home channel
                    Send MAF id, address, DNID to MDC
                    signal MDB ready at MDC
                } else {
                    Send Rsp [I/S] on home channel
                }
                // don't set IDB ready to retire PAF
            }
            // Replay_vector is OR'ed with valid vector at PRQ to
            // re-enable buffered probes to replay from the PRQ
            send Replay_vector to PRQ
```

```
            add replay population count to replay counter
            clear Replay_vector
            // retire
        }
    // non-extract probes are buffered and replayed
    else {
        Set bit in Replay_vector corresponding to PRQ ID
        Signal block_for_replay to PAF
        If (probe marker event type is DirtyAck) {
            Signal IDB ready to IDC with alloc'd id
            Signal move_to_MDB to IDC
            Send MAF id to IDC
            Set merge_MDB bit
            Return home channel buffer to counter
            // we don't signal MDC ready 'til Cmp or ext-pm
        } else { // IAck/SAck/CleanAck probe marker events
            Return home channel buffer to counter
            // we drop data response on CleanAck
        }
    }
}
DAck
set Local_DAck
if (Cmp_1) {
    if (Conflict) {
        send AckCnflt on home channel
    } else if (merge_MDB) {
        send WbMtoS on home channel
        clear merge_MDB bit
        // Cmp_1 bit stays set
    }
} else {
    Return pre-allocated home channel buffer to counter
}
Cmp
if (Cmp_1) { // in conflict flow
    if (Cmp event type is Cmp_fwd) { // explicit forward
        Signal PAF allocator for extract probe allocation
        send Physical_address to PAF
        send Cmp event opcode, RNID, RMAF to PAF
    } else if (Cmp event type is FrcAckCnflt) {
        send AckCnflt on home channel
    } else {
        // Replay_vector is OR'ed with valid vector at PRQ to
        // re-enable buffered probes to replay from the PRQ
        send Replay_vector to PRQ
        add replay population count to replay counter
        clear Replay_vector
        if (merge_MDB) {
            send WbMtoS marker on home channel
            clear merge_MDB bit
            // Cmp_1 bit stays set
            Send MAF id, address, DNID to MDC
            signal MDB ready at MDC
            // wait for vic cmp and finish replay to retire
        } else {
            Return pre-allocated home channel buffer to counter
            // retire
        }
    }
} else { // not yet in conflict flow
    set Cmp_1 bit
    if (Local_DAck) {
        if (Conflict or Cmp event type is FrcAckCnflt) {
            send AckCnflt on home channel
            // merge_MDB may be set, but we wait
            // until 2nd Cmp to convert writeback
        } else if (merge_MDB) {
            send WbMtoS on home channel
            clear merge_MDB bit
            Send MAF id, address, DNID to MDC
            singal MDB ready at MDC
            // convert to victim
            // Cmp_1 bit stays set
        } else {
            Return pre-allocated home channel buffer to counter
            // retire
        }
    } else { // wait for DAck
        if (Cmp event type is FrcAckCnflt) {
            set Conflict bit
        }
        Return pre-allocated home channel buffer to counter
    }
}
```

Examples of Computer Systems

Figure 8:
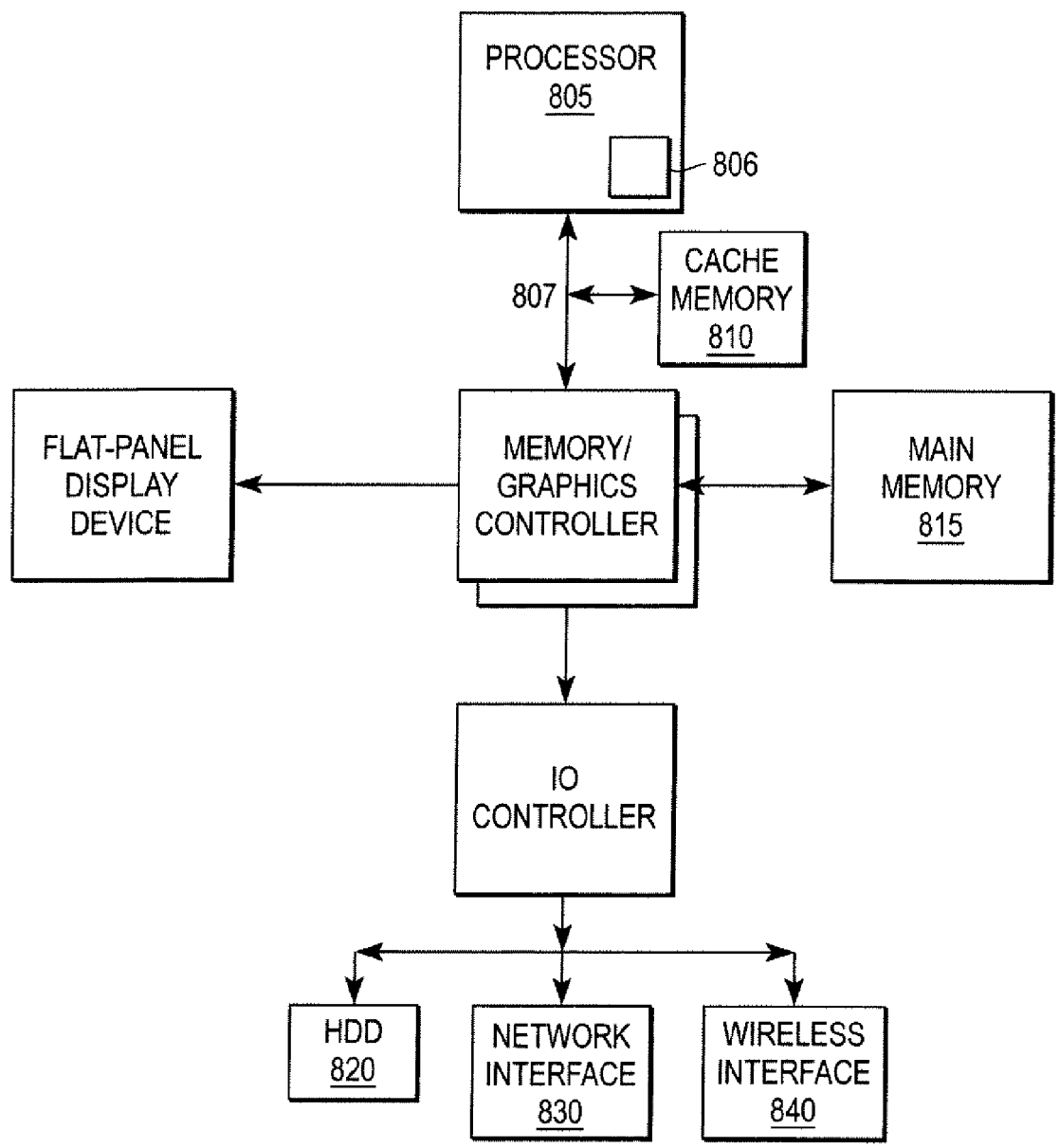
FIG. 8 illustrates a front-side-bus (FSB) computer system in which one embodiment of the invention may be used.

FIG. 8 illustrates a front-side-bus (FSB) computer system in which one embodiment of the invention may be used. A processor 805 accesses data from a level one (L1) cache memory 810 and main memory 815. In other embodiments, the cache memory may be a level two (L2) cache or other memory within a computer system memory hierarchy. Furthermore, in some embodiments, the computer system of FIG. 8 may contain both a L1 cache and an L2 cache.

Illustrated within the processor of FIG. 8 is one embodiment 806. The processor may have any number of processing cores. Other embodiments, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 820, or a memory source located remotely from the computer system via network interface 830 containing various storage devices and technologies. The cache memory may be located either within the processor or in close proximity to the processor, such as on the processor's local bus 807.

Furthermore, the cache memory may contain relatively fast memory cells, such as a six-transistor (6T) cell, or other memory cell of approximately equal or faster access speed. The computer system of FIG. 8 may be a point-to-point (PtP) network of bus agents, such as microprocessors, that communicate via bus signals dedicated to each agent on the PtP network. Within, or at least associated with, each bus agent may be at least one embodiment of invention 806. Alternatively, an embodiment of the invention may be located or associated with only one of the bus agents of FIG. 8, or in fewer than all of the bus agents of FIG. 8.

Figure 9:
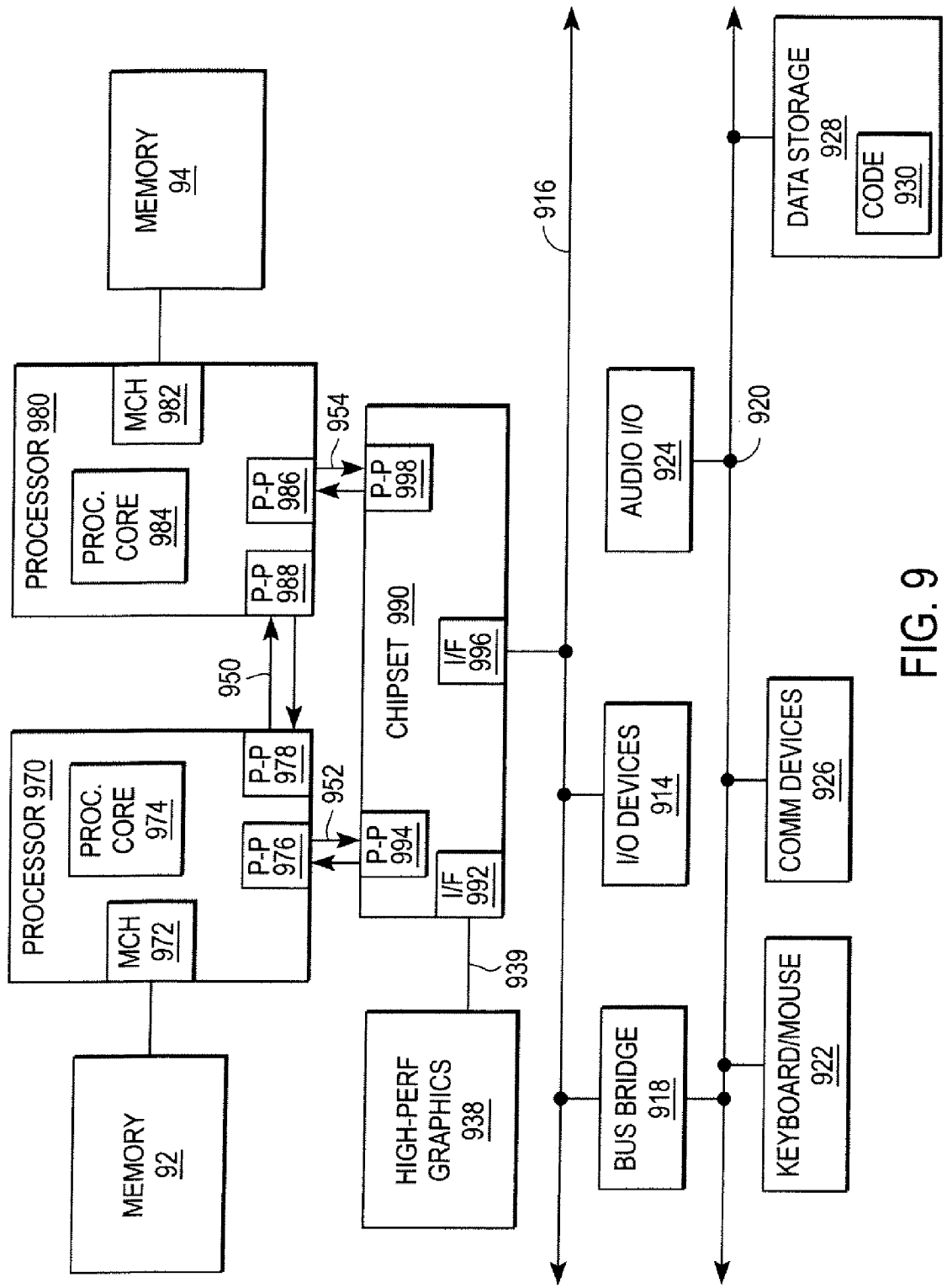
FIG. 9 illustrates a computer system that is arranged in a point-to-point (PtP) configuration.

FIG. 9 illustrates a computer system that is arranged in a point-to-point (PtP) configuration. In particular, FIG. 9 shows a system where processors, memory, and input/output devices are interconnected by a number of point-to-point interfaces.

The system of FIG. 9 may also include several processors, of which only two, processors 970 and 980 are shown for clarity. Processors 970 and 980 may each include a local memory controller hub (MCH) 972 and 982 to connect with memory 22, 24. Processors 970 and 980 may exchange data via a point-to-point (PtP) interface 950 using PtP interface circuits 978 and 988. Processors 970 and 980 may each exchange data with a chipset 990 via individual PtP interfaces 952 and 954 using point to point interface circuits 976, 994, 986 and 998. Chipset 990 may also exchange data with a high-performance graphics circuit 938 via a high-performance graphics interface 939. Embodiments of the invention may be located within any processor having any number of processing cores, or within each of the PtP bus agents of FIG. 9.

Other embodiments of the invention, however, may exist in other circuits, logic units, or devices within the system of FIG.

9. Furthermore, other embodiments of the invention may be distributed throughout several circuits, logic units, or devices illustrated in FIG. 9.

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in detail so as not to obscure the claimed subject matter.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An apparatus comprising:
   one or more cache agents; and
   a protocol agent coupled to the one or more cache agents to receive events corresponding to cache operations from the one or more cache agents and to maintain ordering with respect to the cache operation events, the protocol agent including a structure to resolve conflicts related to the cache operation events,
   wherein the structure included in the protocol agent is configured to produce a mapping between a local cache transaction IDs from the one or more cache agents coupled to the protocol agent to a limited set of coherence level transaction IDs,
   wherein the one or more cache agents independently assign local cache transaction IDs to identify the requests being sent to the protocol agent, regardless of resource availability of coherence level transaction IDs, and
   wherein the structure includes a plurality of rows, each row includes information of a coherence level transaction, and each row includes a bit vector, wherein a bit is set in the block vector for that transaction that identifies an entry of a snoop buffer from which a snoop request issued.

2. The apparatus of claim 1 wherein the structure includes a plurality of entries, wherein each entry is operable to store a cache transaction and to store state information for conflict handling and coherence completion of cache transactions in the plurality of entries.

3. The apparatus of claim 2 wherein the structure registers and initiates coherence operations resulting from a conflicting snoop operation that is directed to an identical address to a pending cache operation event that occurred prior, and the structure handles coherence protocol transitions, data response or coherence handshaking there of, in completing a transaction.

4. The apparatus of claim 3 wherein one of the one or more cache agents processes snoops and completes the snoops independently of an internal conflict state of the protocol agent, the internal conflict state involving pending cache operation events to an identical address.

5. The apparatus of claim 4 wherein one of the one or more cache agents keeps track of data responses independent of coherence protocol handshakes performed by the protocol agent.

6. The apparatus of claim 5 wherein data is prematurely extracted by the one of the one or more cache agents prior to the coherence completion of a corresponding transaction to the same address in the protocol agent.

7. The apparatus of claim 3 wherein one of the one or more cache agents, without visibility as to coherence completion being done at the protocol agent, issues data corresponding with coherence transactions to the same address that may or may not be active in the protocol agent handling coherence completion.

8. The apparatus of claim 2 wherein the structure stores state information for snoop blocking.

9. The apparatus of claim 2 wherein the structure stores state information for manipulating in-flight data from the one or more cache agents.

10. The apparatus of claim 1 wherein the protocol agent contains the structure to produce a mapping between the local cache transaction IDs from the one or more cache agents coupled to the protocol agent to the limited set of coherence level transaction IDs to allow sharing of these coherence level resources across the one or more cache agents coupled to the protocol agent without regard to their number, prior to the allocation of these coherence level resources to handle the cache events.

11. The apparatus of claim 1 wherein a protocol agent handles a coherence transaction in phases, under which it behaves differently to cache events from one of the one or more cache agents.

12. The apparatus of claim 11 wherein the protocol agent phases may be transitioned due to the receiving of conflicting snoop responses, the availability of data corresponding to the transaction via snoop responses, writebacks or other cache transactions thereof, and the receiving of varying types of coherence completion from the system coherence level.

13. The apparatus of claim 1 further comprising a messaging network through which a pre-coherence channel is constructed to communicate cache events in an order that brings the cache ordering point from one of the one or more cache agents into the protocol agent where coherence is processed according to a coherence protocol.

14. A system comprising:
   a microprocessor including one or more cache agents and a protocol agent coupled to the one or more cache agents to receive events corresponding to cache operations from the one or more cache agents and to maintain ordering with respect to the cache operation events, the protocol agent including a structure to resolve conflicts related to the cache operation events; and
   a memory coupled to the microprocessor,
   wherein the structure included in the protocol agent is configured to produce a mapping between a local cache transaction IDs from the one or more cache agents coupled to the protocol agent to a limited set of coherence level transaction IDs,
   wherein the one or more cache agents independently assign local cache transaction IDs to identify the requests being sent to the protocol agent, regardless of resource availability of coherence level transaction IDs, and
   wherein the structure includes a plurality of rows, each row includes information of a coherence level transaction, and each row includes a bit vector, and each row includes a bit vector, wherein a bit is set in the block vector for that transaction that identifies an entry of a snoop buffer from which a snoop request issued.

15. The system of claim 14 wherein the structure includes a plurality of entries, wherein each entry is operable to store a cache transaction and to store state information for coherence completion of cache transactions in the plurality of entries.

16. The system of claim 14 wherein the structure registers and initiates coherence operations resulting from a conflicting snoop operation that is directed to an identical address to a pending cache operation event that occurred prior, and the structure handles coherence protocol transitions, data response or coherence handshaking there of, in completing a transaction.

17. The system of claim 14 wherein the structure causes data filled into a cache memory of one of the one or more cache agents to be buffered in the structure until coherence completion is reached.

18. The system of claim 14 wherein one of the one or more cache agents processes snoops and completes the snoops independently of an internal conflict state of the protocol agent, the internal conflict state involving pending cache operation events to an identical address.

19. The system of claim 14 wherein one of the one or more cache agents, without visibility coherence completion being done at the protocol agent, issues data corresponding with coherence transactions to the same address that may or may not be active in the protocol agent handling coherence completion.

* * * * *